United States Patent

[11] 3,607,954

| [72] | Inventors | Leon Jerzy Belf<br>Avonmouth;<br>David Thomas Saggers, Saffron Walden,<br>Essex, both of England |
|---|---|---|
| [21] | Appl. No. | 793,916 |
| [22] | Filed | Jan. 24, 1969 |
| [45] | Patented | Sept. 21, 1971 |
| [73] | Assignee | Imperial Smelting Corporation (N.S.C.)<br>Limited<br>London, England |
| [32] | Priority | Jan. 29, 1968 |
| [33] | | Great Britain |
| [31] | | 4539/68 |

[54] 3,3' DINITRO-OCTAFLUOROBIPHENYL
4 Claims, No Drawings

[52] U.S. Cl........................................................ 260/646,
424/349
[51] Int. Cl........................................................ C07c 79/12

[50] Field of Search............................................ 260/646,
649; 424/394

[56] References Cited
UNITED STATES PATENTS

| 2,524,069 | 10/1950 | Morrill et al................. | 260/646 X |
| 3,408,411 | 10/1968 | Conrad et al................. | 260/646 |

FOREIGN PATENTS

| 521,514 | 2/1956 | Canada ....................... | 260/646 |

Primary Examiner—Carl D. Quarforth
Assistant Examiner—E. A. Miller
Attorney—Lane, Aitken, Dunner and Ziems ABSTRACT: The new compound 3,3'-dinitro-octafluorobiphenyl is prepared (e.g. by nitration of the corresponding dihydro-compound or biphenyl linking of the 3-bromo 2,4,5,6-tetrafluoronitrobenzene with copper bronze) and formulated into antifungal compositions.

3,3' DINITRO-OCTAFLUOROBIPHENYL

This invention relates to the novel chemical compound 3,3'-dinitro-octafluorobiphenyl and to its uses in combating fungal infestations. The invention further provides antifungal compositions containing 3,3'-dinitro-octafluorobiphenyl together with an inert diluent. In one aspect the invention provides a method of combating fungal disease in a plant which comprises treating the plant with a fungicidal amount of 3,3'-dinitro-octafluorobiphenyl.

3,3'-dinitro-octafluorobiphenyl may be prepared by several methods, including the method described in our copending application No. 23353/66 i.e., by nitration of 3,3'-dihydro-octafluorobiphenyl with a lewis acid (particularly boron trifluoride) and fuming nitric acid in a polar aprotic solvent inert to the nitrating mixture (particularly sulfolane). An alternative method comprises heating 3-bromo-2,4,5,6-tetrafluoronitrobenzene with copper bronze.

Antifungal compositions containing 3,3'-dinitro-octafluorobiphenyl are extremely efficient in combating the disease known as vine downy mildew to which various vine species are prone.

An antifungal composition of the invention may be liquid or solid, and a liquid composition can be a solution, suspension, or emulsion. A surface active agent may be present to stabilize the composition or to facilitate its application.

The composition may contain 3,3'dinitro-octafluorobiphenyl as the only active ingredient, or one or more other compounds having antifungal properties can be present.

The carrier system is chosen from among those well known in the art, and may particularly be an aqueous dispersion of a solution of 3,3'-dinitro-octafluorobiphenyl in a suitable organic solvent. An ionic or nonionic surface-active agent may be used.

The invention is illustrated by the following Examples:

EXAMPLE 1

Preparation via 3-bromo-2,4,5,6tetrafluoronitrobenzene a. 2,3,4,6-tetrafluorobromobenzene, (prepared by the method of British Pat. No. 1,067,412) 219 g., was added slowly to a nitration mixture composed of 265 ml. concentrated nitric acid and 425 ml. of concentrated sulfuric acid maintained at 0° C. in a cooling bath. The mixture was allowed to warm to 10° C., stirred for 10 hours, and then poured onto crushed ice. After separation and drying, the organic material was distilled to give the desired nitro compound, b.p. 106°–108° C.

b. A mixture of 3-bromo-2,4,5,6-tetrafluoronitrobenzene, 39.2 g., and copper bronze, 47.7 g., were sealed in a glass ampul and heated at 130°–140° C. for 63 hours. After cooling, the ampul was opened and the contents extracted with ether. Distillation of the extracts gave a yellow oil, b.p. 133°–144° C. at Ca 0.3 mm. Hg. pressure, which crystallized on standing to a yellow solid, m.p. 39°–41° C.

EXAMPLE 2

Preparation via the Nitration of 3,3'-dihydro-Octafluorobiphenyl a. A mixture of 2,3,4,6-tetrafluorobromobenzene, 480 g., and copper bronze 146 g., was stirred in refluxing dimethylformamide for 8 hours. The mixture, after cooling, was diluted with water, and steam distilled. After separation and drying the organic distillate was redistilled to give 3,3'-dihydro-octafluorobiphenyl, b.p. 95°–98° C. at 11 mm. Hg. pressure; m.p. 64°–66 C:

| Analysis: | $C_{12}F_8H_2$: | requires | C, 48.3, H, 0.7, F, 51.0. |
|---|---|---|---|
| | | found | C, 48.4, H, 0.5, F, 50.3 | b. A nitrating mixture was first prepared by cooling a mixture of tetramethylene sulfone (sulfolane), 100 ml., and fuming nitric acid, 28 ml., to 0° C. and saturating it at this temperature with boron trifluoride gas (this required 3 hours). The stirred mixture was then allowed to warm to about 15° C.

To this mixture was added 3,3'-dihydro-octafluorobiphenyl, 23.1 g., in small portions. After addition was complete, the mixture, still stirred, was heated to and maintained at 65°–70° C. for young hours. After cooling it was then poured into water. The organic layer was separated, the remaining aqueous phase extracted with methylene chloride, the organic materials bulked together, dried, and then distilled to give the same compound, of identical constants to those in example 1, and showing no depression on measurement of mixed melting point.

EXAMPLE 3

1. Aqueous acetone solutions/suspensions of 3,3'-dinitro-octafluorobiphenyl containing 2,000 and 500 parts per million (p.p.m.) wt./vol. together with 125 p.p.m. of a suitable wetting agent were applied to the leaves of young potato plants having seven fully expanded leaves.

2. The treated plants, together with controls treated with wetting agent alone, were inoculated 24 hours after the chemical application with an aqueous suspension of sporangia of the disease organism known as potato blight, *Phytophthora infestans*.

3. The plants were then placed in water saturated atmosphere for 24 hours and then transferred to a controlled environment room (18° C. and 80–90 percent R.H.) until disease incidence was measured five days later when it was found that the treatments at 2,000 and 500 p.p.m. had given 98 and 96 percent disease reduction respectively in comparison with less than 5 percent on the controls.

EXAMPLE 4

Aqueous acetone solutions/suspensions of 3,3'-dinitro-octafluorobiphenyl containing 2,000 parts per million (p.p.m.) wt./vol. together with 25 p.p.m. of a suitable wetting agent were applied to the leaves of young cucumber plants with two fully expanded leaves.

The treated plants, together with controls treated with wetting agent alone, were inoculated 24 hours after the chemical applications were an aqueous suspension of the disease organism known as cucumber powdery mildew, *Erysiphe cichoracearum*.

The plants were then placed in a water saturated atmosphere for 24 hours and then transferred to a controlled environment room (18° C. and 80–90 percent R.H.) until disease incidence was measured 14 days later when it was found that the treatment at 2,000 p.p.m. had given 98 percent disease reduction in comparison with less than 5 percent on the controls.

EXAMPLE 5

Sufficient 3,3'-dinitro-octafluorobiphenyl was incorporated into the nutrient known as potato dextrose agar in the molten state to produce concentrations of 300, 100 and 30 parts per million (p.p.m.) wt./vol. of medium. The mixing was carried out in petri dishes and the cooled culture plates were inoculated with mycelial plugs (6 mm. diameter) of the following fungal species:

*Phytophthoro palmivora*

*Pythium ultimum*

*Rhizoctonia solani*

*Fusarium oxysporum f. cubense*

*Verticillium albo-atrum*

*Lenzites trabea* and with filter paper discs dipped in a suspension of spores of the following species:

*Aspergillus niger*

*Cladosporium herbarum*

*Penicillium digitatum*

The plates were incubated at 22° C. for seven days after which the mycelial diameters were measured and compared with untreated controls.

In every case the compound was observed to have reduced fungal growth by greater than 95 percent.

We claim:
1. 3,3'-dinitro-octafluorobiphenyl.
2. A method of producing 3,3'-dinitro-octafluorobiphenyl, comprising the steps of:
   nitrating 3,3'-dihydro-octafluorobiphenyl with a mixture of fuming nitric acid and a Lewis acid in a polar aprotic solvent inert to the nitration mixture;
   washing the reacted mixture with water and retaining the organic phase; distilling off the 3,3' dinitro compound under reduced pressure.
3. A method as claimed in claim 2 which comprises the steps of:
   cooling a mixture of sulfolane as inert solvent and fuming nitric acid;
   adding to the cooled mixture borontrifluoride gas as the Lewis acid;
   adding at room temperature small portions of 3,3'-dihydro-octafluorobiphenyl to effect nitration;
   thereafter washing the reacted mixture and distilling off the product.
4. A method of producing 3,3'-dinitro-octafluorobiphenyl, comprising the steps of:
   heating 3-bromo-2,4,5,6-tetrafluoronitrobenzene with copper bronze to effect a biphenyl linkage by elimination of bromine atoms;
   extracting the reacted products with an organic solvent; distilling off the required dinitro compound.